United States Patent
Checketts et al.

(10) Patent No.: US 9,741,029 B2
(45) Date of Patent: *Aug. 22, 2017

(54) MOBILE COMPUTING DEVICE NETWORK OF MULTI-VENDOR, MULTI-INTERFACE COMPUTERS

(75) Inventors: Nathaniel L. Checketts, Lehi, UT (US); M. Blake Freguson, Spanish Fork, UT (US); Harold F. Widlansky, Salt Lake City, UT (US); David B. McNamee, Farmington, UT (US); Dallas J. Earl, Cedar Hills, UT (US); Richard J. Bertlesen, Springville, UT (US)

(73) Assignee: VenueNext, Inc., Santa Clara, CA (US)

( * ) Notice: Subject to any disclaimer, the term of this patent is extended or adjusted under 35 U.S.C. 154(b) by 923 days.

This patent is subject to a terminal disclaimer.

(21) Appl. No.: 13/453,811

(22) Filed: Apr. 23, 2012

(65) Prior Publication Data

US 2013/0110561 A1   May 2, 2013

Related U.S. Application Data

(63) Continuation of application No. 12/581,961, filed on Oct. 20, 2009, now Pat. No. 8,175,913.

(Continued)

(51) Int. Cl.
*G06Q 20/32* (2012.01)
*G06Q 10/08* (2012.01)
*G06Q 20/10* (2012.01)
*G06Q 20/12* (2012.01)
*G06Q 20/20* (2012.01)

(Continued)

(52) U.S. Cl.
CPC ........... *G06Q 20/32* (2013.01); *G06Q 10/087* (2013.01); *G06Q 20/102* (2013.01); *G06Q 20/12* (2013.01); *G06Q 20/201* (2013.01); *G06Q 20/322* (2013.01); *G06Q 20/325* (2013.01); *G06Q 20/3255* (2013.01); *G06Q 30/0205* (2013.01); *G06Q 30/0238* (2013.01); *G06Q 30/0601* (2013.01); *G06Q 30/0603* (2013.01)

(58) Field of Classification Search
USPC ........................................ 705/10, 26, 28, 14
See application file for complete search history.

(56) References Cited

U.S. PATENT DOCUMENTS

2004/0030601 A1   2/2004   Pond et al.
2007/0043632 A1   2/2007   Abelow
(Continued)

*Primary Examiner* — Vanel Frenel
(74) *Attorney, Agent, or Firm* — Fenwick & West LLP

(57) ABSTRACT

An apparatus 10, and system 70 may be embodied as an article 70 or method implementing transactions between a central or "core" application 72, a fulfillment application 96 at a venue, and a wireless communication application 84, 86 hosted on a computing device 10, such as a cell phone, of an attendee at an event at that venue. Customers may sign up online, through various types of web applications 88 or dedicated applications 92, to receive information, such as menus, catalogs, or the like of available products to be at the event. The core application 72 may manage a database 74 of records of customers, products, and fulfilment locations, and may send to fulfilment locations instructions to dispatch "runners" to deliver products to seat locations of customers ordering through wireless computer devices 12 at a venue.

19 Claims, 6 Drawing Sheets

Related U.S. Application Data

(60) Provisional application No. 61/153,908, filed on Feb. 19, 2009.

(51) Int. Cl.
  *G06Q 30/02* (2012.01)
  *G06Q 30/06* (2012.01)

(56) References Cited

U.S. PATENT DOCUMENTS

| | | | |
|---|---|---|---|
| 2007/0198432 A1 | 8/2007 | Pitroda et al. | |
| 2008/0120129 A1 | 5/2008 | Seubert et al. | |
| 2011/0173041 A1* | 7/2011 | Breitenbach | G06Q 10/06311 705/7.13 |
| 2012/0109762 A1* | 5/2012 | Getchius | G06Q 20/20 705/17 |
| 2015/0356502 A1* | 12/2015 | Agasti | G06Q 30/0635 705/339 |
| 2016/0155108 A1* | 6/2016 | McLaughlin | G06Q 20/20 705/21 |

\* cited by examiner

US 9,741,029 B2

MOBILE COMPUTING DEVICE NETWORK OF MULTI-VENDOR, MULTI-INTERFACE COMPUTERS

RELATED APPLICATIONS

This application is a continuation of U.S. patent application Ser. No. 12/581,961 filed on Oct. 20, 2009, for MOBILE COMPUTING DEVICE NETWORK OF MULTI-VENDOR, MULTI-INTERFACE COMPUTERS, which claims the benefit of U.S. Provisional Patent Application Ser. No. 61/153,908, filed on Feb. 19, 2009 for MULTI-VENDOR, MULTI-INTERFACE, ORDER-PAYMENT-FULFILLMENT INTEGRATION APPARATUS AND METHOD.

BACKGROUND

1. The Field of the Invention

This invention relates to computer systems and software and, more particularly, to novel systems and methods for connecting personal digital assistants (PDAs), cell phones, and computers for taking, tracking, delivering, and accounting for orders for goods at points of sale and delivery.

2. The Background Art

Event venues include stadiums, arenas, sports domes, ball fields, concert halls, and so forth. Associated with events, in many instances, are various merchandising operations. For example, refreshment concessions are often associated with events. Sometimes, events may have a substantial presence of multiple concessionaires. Food, drinks, trinkets, memorabilia, fan-appropriate clothing, and so forth, may all be available through one or more vendors present as concessionaires at a particular venue. Leaving one's seat at an athletic event, for example, may be problematic.

If a game or other event is particularly fast moving, such as in basketball or soccer, an individual must often miss a certain portion of the game in order to stand in line at a concessions stand back away from the seating area at some concourse dedicated to such concessions. Not just the wait at a location from which the sporting event cannot be viewed, but the entering and leaving of stadium seating may also obstruct the view temporally of other users, and so forth. The result is to diminish the experience the ticket holder and the other attendees. Moreover, the alternative decision may also cost the venue.

Individuals who prefer not to disrupt their neighbors, nor to miss a part of the game, may not purchase from the concessionaires. Thus, satisfying customers with the products of concessionaires, without disrupting the game is currently not an available option.

Moreover, in some venues, such as baseball parks, concessionaires often hawk products by way of vendors walking among the stadium seating. The hawkers themselves may become a distraction. Likewise, the transactions may also be interrupting to bystanders not involved in the transaction. Such hawkers may eliminate some of the waiting, such as waiting in line on some back concourse waiting for service at a concession booth. However, it is not clear that they produce any less anticipation, distraction, or change in focus for the user.

For example, a user must get the attention of the vendor. Thus, the user must pay more attention to the vendor for some period of time than to the game, in order to make sure that contact is made with the vendor, and that the vendor mentally puts the new potential customer in his or her mental cue for service in the very near future.

What is needed is a faster, more efficient, less disrupted system whereby customers can be satisfied with a maximum exposure to the event at a venue, maximum comfort with access to food, refreshment, memorabilia, or other merchandise, while the venue maximizes its revenue from ticket sales as well as concessions sales or royalties.

BRIEF SUMMARY OF THE INVENTION

In view of the foregoing, in accordance with the invention as embodied and broadly described herein, a method and apparatus are disclosed in one embodiment of the present invention as including an apparatus, system, article, and method to implement transactions between a core module, a product fulfillment location at a venue, and a wireless communication device of an attendee at an event at that venue.

For example, an apparatus and method in accordance with the invention may provide a database containing records corresponding to customers, products, and fulfilment terminals delivering the products to the customers. This may include providing a core terminal comprising a processor executing instructions programmed to receive orders from the customers, send fulfilment instructions to the fulfilment terminals, and control access to the database. This process may involve obtaining from a customer certain sign-up information, including an identifier uniquely identifying the customer, contact information, and address information for at least one electronic communication channel, such as a cell phone, PDA, or other wireless electronic device.

The core terminal may provide a list of products and prices to customers, and receive orders, which will be delivered to a fulfilment location having a computer terminal to receive order, control preparation and dispatching thereof within the venue, and track the status thereof. The core terminal will typically handle the financial transaction with an appropriate payment gateway, based on the order.

In one embodiment, processors executing instructions and memory devices operable connected thereto, may execute and store, respectively, various executables implementing the invention. Executables (executable modules) may include a fulfilment module used at a location delivering products to customers; a database module creating and managing records corresponding to customers, products, and the fulfilment modules; a core module coordinating with the fulfilment module and controlling access to the database. A customer module may obtain customers information at sign-up, such as an identifier uniquely identifying the customer, contact information, an "address" such as a phone number or URL for a customer's electronic communication channel, and credit card information.

The core module may provide directly to a customer's communication channel address a list of products and prices, and receive therefrom an order it will deliver to the fulfilment module. The fulfilment module will direct a person to deliver the product, and will receive inputs reflecting the status of the order, including successful delivery and failure of delivery, to be reported to the core module. The core module processes financial transactions based on the order and delivery, through payment gateway modules, such as third party credit card gateways.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 2 is a schematic block diagram of one embodiment of a system in accordance with the invention, hosted on a system of one or more computers and accessed by other computational devices, whether PDAs, smart phones, computers, or the like;

Figure 6:
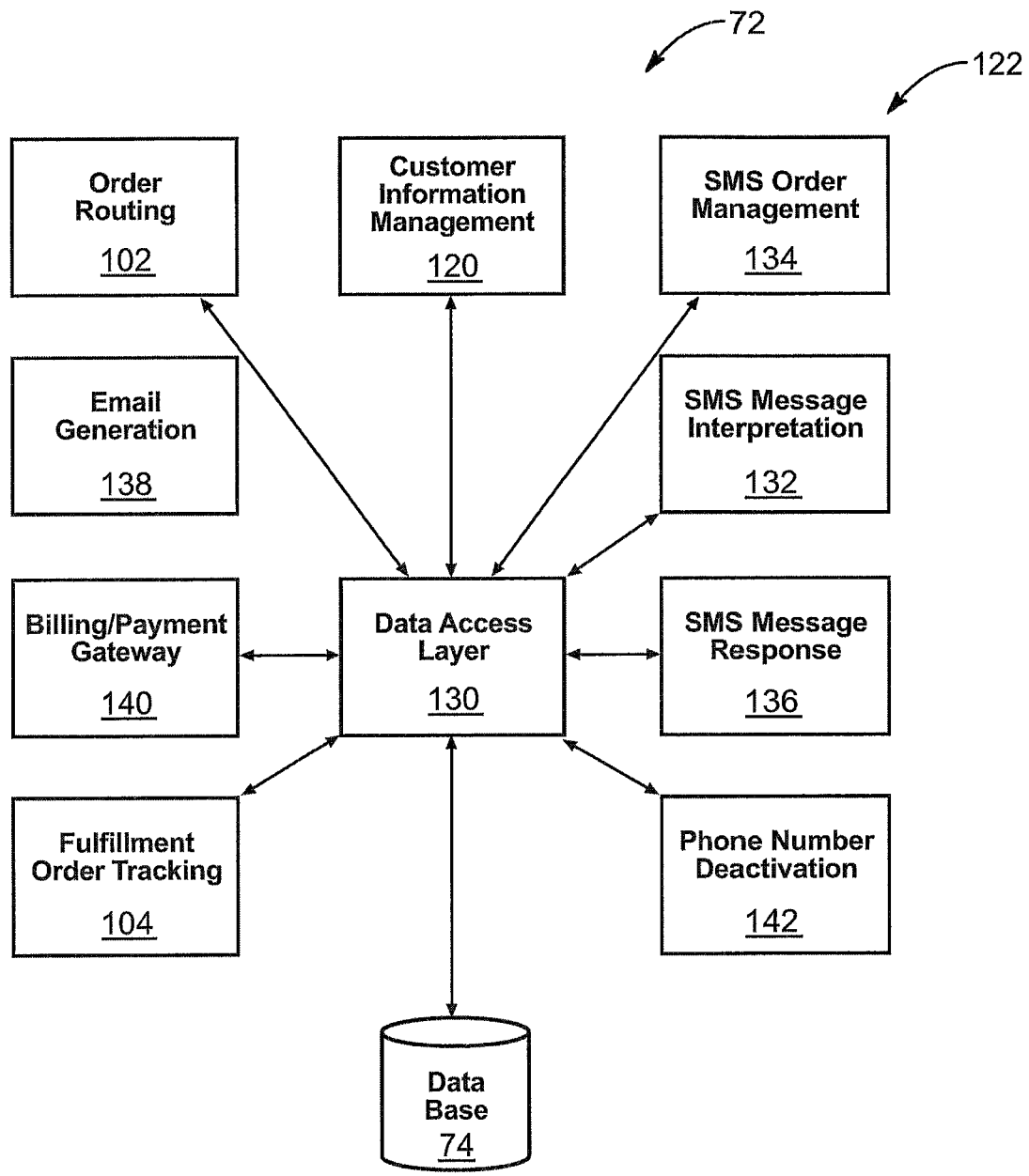

although these same modules may be included in other web applications having the same functions responsibilities as the kiosk application, and other locations, such as smart phone, browser accessed web sites, and the like;

FIG. 6 is a schematic block diagram of one embodiment of the data access layer module with its coordinating modules within or accessed by the core application of a system in accordance with the invention, and represents a transactional logic layer in the system of invention.

DETAILED DESCRIPTION OF THE PREFERRED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Figure 1:
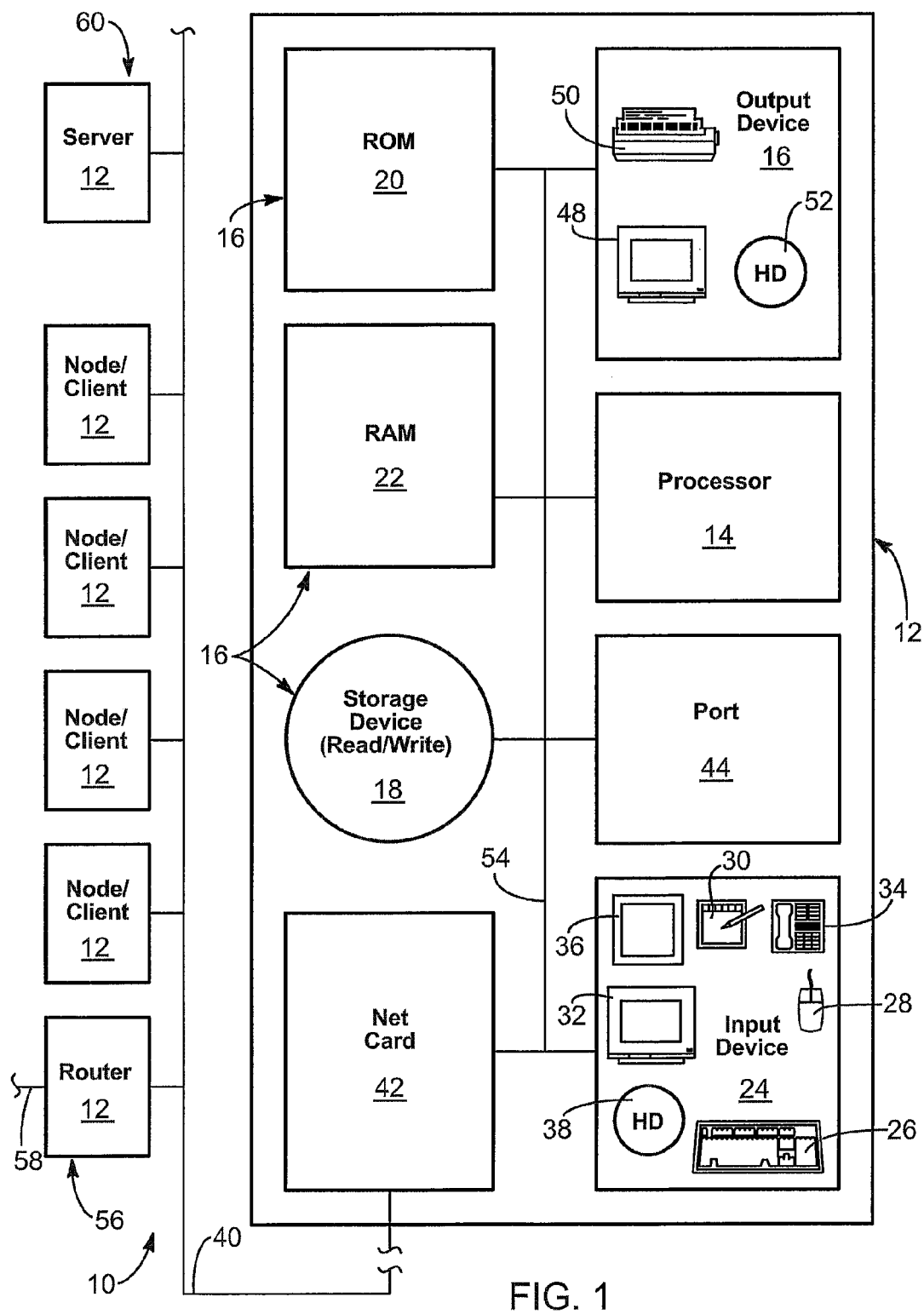
FIG. 1 is schematic block diagram of one embodiment of apparatus in accordance with the invention, wherein various computers may be interconnected, by wire or wireless connections through networks, internet works, and the like in order to communicate with one another.

Referring to FIG. 1, an apparatus 10 or system 10 for implementing the present invention may include one or more nodes 12 (e.g., client 12, computer 12). Such nodes 12 may contain a processor 14 or CPU 14. The CPU 14 may be operably connected to a memory device 16. A memory device 16 may include one or more devices such as a hard drive 18 or other non-volatile storage device 18, a read-only memory 20 (ROM 20), and a random access (and usually volatile) memory 22 (RAM 22 or operational memory 22). Such components 14, 16, 18, 20, 22 may exist in a single node 12 or may exist in multiple nodes 12 remote from one another.

In selected embodiments, the apparatus 10 may include an input device 24 for receiving inputs from a user or from another device. Input devices 24 may include one or more physical embodiments. For example, a keyboard 26 may be used for interaction with the user, as may a mouse 28 or stylus pad 30. A touch screen 32, a telephone 34, or simply a telecommunications line 34, may be used for communication with other devices, with a user, or the like. Similarly, a scanner 36 may be used to receive graphical inputs, which may or may not be translated to other formats. A hard drive 38 or other memory device 38 may be used as an input device whether resident within the particular node 12 or some other node 12 connected by a network 40. In selected embodiments, a network card 42 (interface card) or port 44 may be provided within a node 12 to facilitate communication through such a network 40.

In certain embodiments, an output device 46 may be provided within a node 12, or accessible within the apparatus 10. Output devices 46 may include one or more physical hardware units. For example, in general, a port 44 may be used to accept inputs into and send outputs from the node 12. Nevertheless, a monitor 48 may provide outputs to a user for feedback during a process, or for assisting two-way communication between the processor 14 and a user. A printer 50, a hard drive 52, or other device may be used for outputting information as output devices 46.

Internally, a bus 54, or plurality of buses 54, may operably interconnect the processor 14, memory devices 16, input devices 24, output devices 46, network card 42, and port 44. The bus 54 may be thought of as a data carrier. As such, the bus 54 may be embodied in numerous configurations. Wire, fiber optic line, wireless electromagnetic communications by visible light, infrared, and radio frequencies may likewise be implemented as appropriate for the bus 54 and the network 40.

In general, a network 40 to which a node 12 connects may, in turn, be connected through a router 56 to another network 58. In general, nodes 12 may be on the same network 40, adjoining networks (i.e., network 40 and neighboring network 58), or may be separated by multiple routers 56 and multiple networks as individual nodes 12 on an internetwork. The individual nodes 12 may have various communication capabilities. In certain embodiments, a minimum of logical capability may be available in any node 12. For example, each node 12 may contain a processor 14 with more or less of the other components described hereinabove.

A network 40 may include one or more servers 60. Servers 60 may be used to manage, store, communicate, transfer, access, update, and the like, any practical number of files, databases, or the like for other nodes 12 on a network 40. Typically, a server 60 may be accessed by all nodes 12 on a network 40. Nevertheless, other special functions, including communications, applications, directory services, and the like, may be implemented by an individual server 60 or multiple servers 60.

In general, a node 12 may need to communicate over a network 40 with a server 60, a router 56, or other nodes 12. Similarly, a node 12 may need to communicate over another neighboring network 58 in an internetwork connection with some remote node 12. Likewise, individual components may need to communicate data with one another. A communication link may exist, in general, between any pair of devices.

Figure 2:
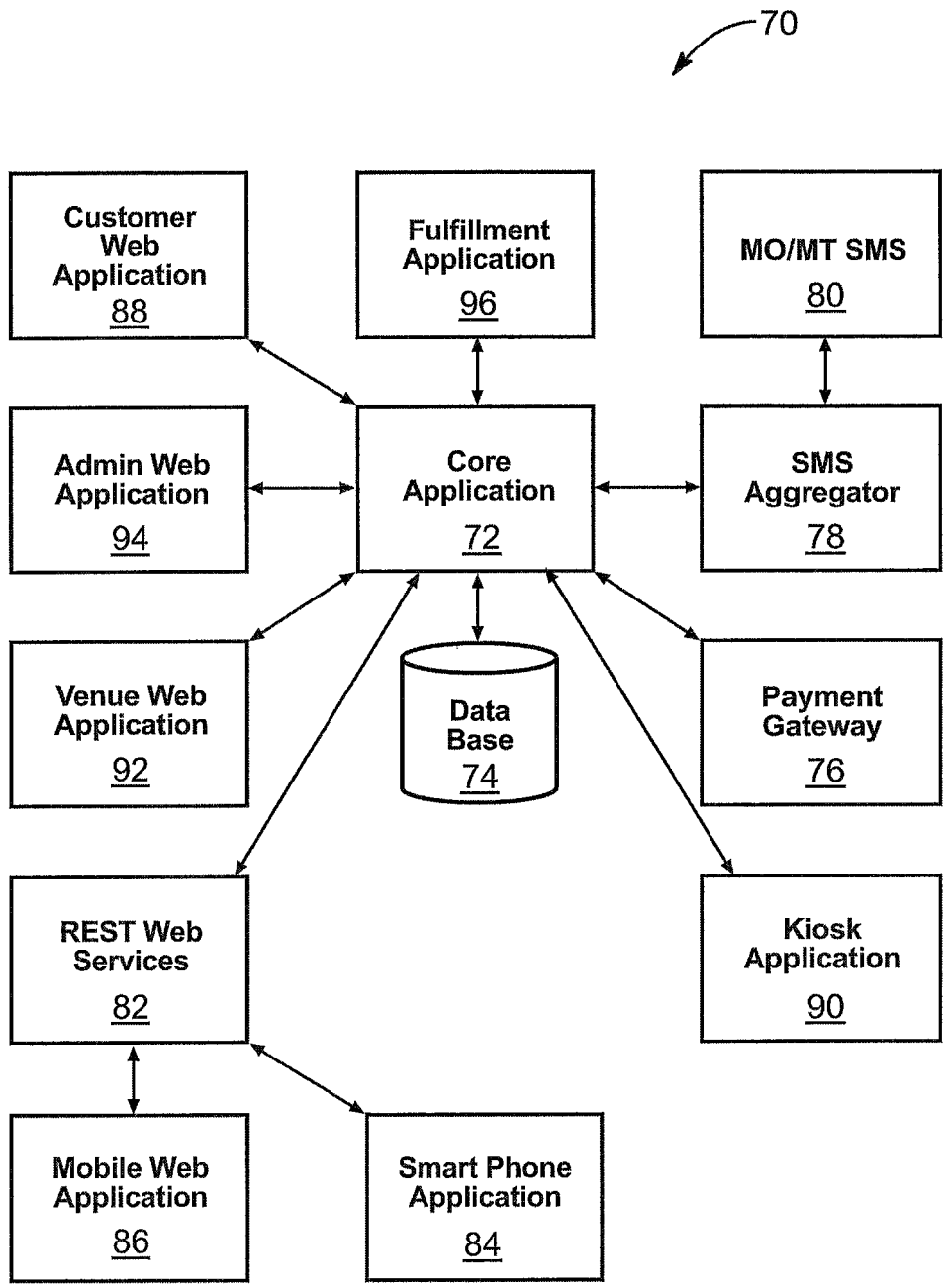

Referring to FIG. 2, an apparatus 10 may host a system 70 including an application 72 or core application 72 stored in memory 16 and executing on the processor 14 of a computer 12.

A system 70 in accordance with the invention may rely on a core application 72. The core application 72 is a central executable operable on a central processing unit (CPU) of a computer or multiple CPU's in multiple computers. That is, for example, the core application 72 may be a centralized or distributed processing executable for executing all of the functionalities of a system in accordance with the invention.

The core application 72 accesses a database 74 stored in a memory device. Of course, the memory device may be in one or more embodiments, and may be distributed or centralized. In one embodiment, in accordance with the invention, the database 74 may contain records, which may be embodied in various tables, objects, or the like. For example, the database 74 may contain records identifying information pertinent to individual orders by customers, menu items, menu selections offered by a particular venue, venue administrative data and the like.

In certain embodiments, the database 74 may also include customer records. For example, a particular customer may sign up for the Mangia™ service, and thereby enter all pertinent data corresponding to that customer. That information need not be reentered every time the customer accesses the system 70, orders a product, or the like.

In accordance with good security and customer protection practices, the database 74 may not contain sensitive information. Of particular concern is information that by being compromised may cause a breach of duty of confidentiality owed to the customer. For example, complete credit card numbers, expiration dates, verification codes, and the like necessary to access credit card information need not be saved in the database 74, in certain embodiments of an application in accordance with the invention.

In one embodiment, a database record corresponding to a particular customer may include one or more codes for cross-referencing or indexing. These codes may then be used as index references, security indices, and the like in order to correspond with a payment gateway 76, an executable operable by the core application 72. For example, when the core application 72 accesses a payment gateway 76, the payment gateway 76 on codes in the database 74 in order to link to its own secured payment information, the desired information needed with respect to a particular customer.

In one embodiment, a payment gateway 76 may be provided by a third party service. For example, PayPal™ implemented by eBay, as well as other services such as authorize.net™, and the like provide payment gateways 76. In one embodiment, the core application 72 may include an interface for the payment gateway 76. The payment gateway 76 interface passes between the core application 72 and the payment gateway 76 certain information.

In embodiment, for example, an XML document may contain all of the necessary information required by the payment gateway 76. This XML document may be provided by the core application 72 to the payment gateway 76. One may think of an XML document as a structured format for passing data efficiently. Accordingly, each XML document may also be thought of as a data record being passed between applications.

Accordingly, an XML document containing the data required by the payment gateway 76 may be passed after preparation by the core application 72 in order to be processed by the payment gateway 76. Accordingly, the payment gateway 76 may then process the transaction, and return (in a suitable XML document to the core application 72) a record indicating the disposition of the transaction.

In one embodiment of an application in accordance with the invention, the core application 72 may provide an additional XML document, or data embedded in an XML document to the payment gateway 76. Accordingly, a user may access the core application 72 through the user interface thereof, and bring up the record information corresponding to that customer. Accordingly, the core application 72 may then pass to the payment gateway 76, an XML document updating customer information in accordance with the request of the customer.

In one embodiment, an SMS interface may be formed as a part of the core application 72. In certain embodiments, the SMS interface may be a separate executable accessed by the core application 72, or may be embedded in a core application 72.

In yet another alternative embodiment, the application may communicate with an SMS aggregator 78. A benefit of an SMS aggregator 78 is that the protocols, short code addresses, negotiations with the SMS services of the different cell phone carriers, and the like may all be handled by an SMS aggregator 78. Accordingly, the core application 72 need only communicate with the SMS aggregator 78 in order to send and receive messages to various SMS addresses of various customers obtaining there the desired access to customers using cell phone services through the various cell phone carriers available.

Accordingly, the SMS aggregator 78 may have negotiated all the relationships, and consolidated them so that the core application 72 can access any address. The system 70 can receive orders from any address of any cell phone user connected to any conventional SMS service. Also, SMS service is typically piggybacked as part of a cell phone service by the cell phone carrier.

In one presently contemplated embodiment of an apparatus and method in accordance with the invention, the core application 72 may actually communicate with an SMS aggregator 78 through XML files as well. Accordingly, routing information, customer contacting information, carrier information, and the like may all be included in an XML document passed between the core application 72 and the SMS aggregator 78. Accordingly, data may be passed in a much more compact and efficient format to support transactions.

By use of an XML document for passing information between the core application 72 and the SMS aggregator 78, the user can be blissfully ignorant of much administrative information. The customer user may successfully conduct a transaction without having to pass necessary administrative information by SMS text messages.

In other alternative embodiments, other interfaces may be used as a format for passing information. For example, the SMPP interface may actually provide higher throughput. However, that volume of information has not been warranted in every application in accordance with the invention. Likewise, other proprietary formats for data structures also may be implemented.

Examples of SMS aggregators 78 may include the mBLOX™ system, one well-established aggregator. One advantage of using a third-party system as an SMS aggregator 78 is that the need for access between various SMS networks is sufficiently ubiquitous that companies such as mBLOX™ exchange information across networks internationally. Accordingly, their business involves negotiating with carrier systems internationally for addressing information, protocols, and the like in order to implement communications between various messaging systems. Accordingly, as protocols change, carriers come and go, and carrier systems are bought, sold, and modified, the SMS aggregator 78 may provide a service of creating an interconnecting internet messaging service on which everyone can rely for communicating between various carrier networks.

Thus, the mobile originated and mobile terminated SMS systems 80 communicating with the SMS aggregator 78 represent all of the mobile units, regardless of network, that can communicate with one another. Each of the mobile originated 80 (meaning that the message or messaging content originates with a cell phone or other SMS hardware device of a user) and the mobile terminated (meaning that a message arrives ultimately at a particular cell phone or other SMS device) device 80 can be accessed by the aggregator 78 by SMS communication. The various devices controlled or possessed by individuals or entities communicate with one another, over the connection therebetween, which represents all of the carriers. Thus, the connection between the MO/MT SMS module 80 and the SMS aggregator 78 represents each and every communicator or communicating device in the connection with the SMS aggregator 78, and thus represents the various network communications or network connections between those individual devices, and the SMS aggregator 78 responsible for inter-network communications.

Notwithstanding, the extensive, even ubiquitous, use by teenagers of instant messaging, not all communications involve the audio frequency bands of the telecommunications industry. That is, for example, a telephone call, whether from a cell phone or other, occupies a particular communication network. Because of the compact nature of a text message, it can be sent as a very small packet consuming extremely small, almost insignificant, amounts of bandwidth. Text messaging may be transferred between telephone systems and between telephone users, over the telephone network. Nevertheless, the internet or other major data networks may rely on email and other data transfer systems that are passed over dedicated data lines or frequency bands.

The Blackberry™, the iPhone™, and other "smart phones" provide extensive web access as well as telephone access. In fact, many cellular phones now include certain data transfer functions with the internet. In some cases, the internet access is not available to the user, but only to the system 70. In other instances, the cell phone owner may obtain certain web browsing functionality over the cell phone, by way of the internet interface. Thus, in addition to SMS texting, various phones, in increasing numbers, may also access the core application 72 through the internet over a web browser.

Thus, many cellular telephones today include both SMS texting functionality over audio bands, as well as certain web interfaces over the internet, such as through broadband carriers, and the like. Even cell phones that do not provide access to the internet by a user, may rely on internet applications and internet communication links in order to perform the administrative functionality for the carrier.

Systems such as the Blackberry™, the iPhone™ and other "smart phones," may include extensive internet access for a user over "data bands" in addition to telephone "audio bands" access. Thus, whereas the SMS messaging systems operate by sending very compact, efficient, messages in bursts that require almost negligible bandwidth, the internet systems provide access directly over data bands of the internet for browser support.

Since "smart phones" (e.g., Blackberry™, iPhone™) may provide access to web browser-based applications as well as SMS messaging, the core application 72 may communicate to a user through a particular SMS service, or directly over the web through a smart phone application.

In one embodiment of an apparatus and method in accordance with the invention, a representational state transfer application may interface with the core application 72. The representational state transfer (REST) services module 82 is responsible to provide access to the core application 72 by various other applications. One may think of this as a native application communicating with the core system through HTTPS to the REST services module 82. Such an application may typically rely on HTTPS. Although such systems may be web enabled, they need not be, and typically would not be, traditional "web" applications accessed through a browser.

For example, "smart phones" such as the iPhone™ and Blackberry™ systems provide to a user the ability to add specific web applications that run in native code on those particular hardware platforms. Accordingly, in one embodiment, a user may download from the internet, a particular "smart phone" application 84 with all the desired functionality to access the core application 72.

By contrast, in other embodiments, a user may simply go to a browser application already hosted on a smart phone, and through that browser access a mobile web application 86 much as one would simply access a web page of any particular web service. Thus, whether by a dedicated application 84 hosted in native code on the hardware platform of a user, or through a browser application that accesses a web page of a web application 86 the REST web services 82 may provide access to the core application 72 for a user.

Smart phones today are more powerful than many of the mainframe computers of yesteryear Likewise, many smart phone applications involve nothing more than a user interfacing with the smart phone system as a computer. For example, games, calculators, camera photo albums, and the like are hosted on smart phones. Accordingly, a user may access an application written in native code for the environment provided by the hardware platform of the user.

In one embodiment of an apparatus and method in accordance with the invention, the native code application 84 downloaded by a user from or through the core application 72 to the user's own smart phone, through the REST web services module 82 may access internet functionality as well as functionality on the smart phone itself. Thus, part of the processing, preparation, and other information processing may be done directly on the smart phone by the application 84.

By the same token, the internet communication functionality may be implemented in internet processing capability of the smart phone directly through the REST web services module 82. Thus, "client side" processing, as convenient or necessary, may be executed by the smart phone application 84. Likewise, downloading, uploading, and accessing web services may be done by the smart phone application 84 by way of accessing the REST web services module 82.

Likewise, the browser hosted in native code on a smart phone may access the mobile web application 86 on the internet. In certain embodiments, the REST web services module 82 interfaces with both the direct smart phone applications 84, as well as mobile web applications 86 hosted on an internet site to be accessible by browsers from elsewhere.

Thus, the processing of information may be done in the core application 72, but may also be distributed out to the individual mobile web applications 86 and smart phone applications 84 to the extent that the client-side processing may be off-loaded to the client processor.

In certain embodiments, the REST web services 82 may present or expose sign-up services. Thus, through a mobile web application 86 or through a downloaded and installed smart phone application 84, a user may access the core application 72, and thereby bring up the web pages required to sign up for the services of the system 70.

In an alternative embodiment, an individual may sign up directly over the internet. Just as an individual may access the mobile web application 86 through a browser of a mobile platform such as a smart phone, an individual may use the customer's own browser on a customer's own computer to access a customer web application 88. Alternatively, a user may obtain access at a particular venue, by way of a kiosk, in which the computer is owned by the venue, or by the service provider of the core application 72. Thus, whether by a mobile platform, such as a mobile web browser, or a smart phone, or by a stationary computer application, such as a user's own personal computer or a dedicated Kiosk computer, an individual may access the core application 72 and navigate the sign up page in order to enter the user's information. Thus, the customer web application may be a particular application hosted over the internet and accessible by a browser from any computer. Meanwhile, a kiosk application 90 may provide a dedicated link, a dedicated computer, or a combination thereof in order to access the same functionality.

Once connected to the core application 72, an individual may execute certain executables to obtain functional benefits. Thus, whether accessing the customer web application 88, the kiosk application 90, the mobile web application 88, or the smart phone application 84, a user may then achieve the services desired.

Figure 3:
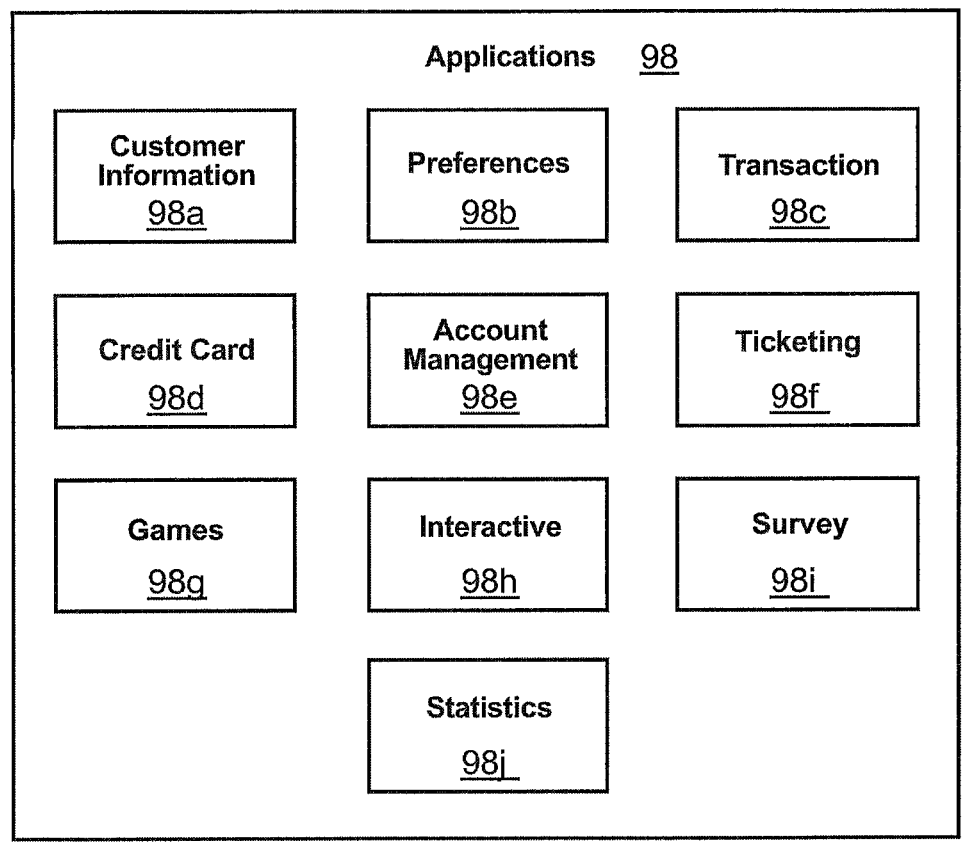
FIG. 3 is a schematic block diagram of certain functional modules that may be imbedded within or accessed by the core application 72 in order to accomplish the functions associated therewith.

Referring to FIG. 3, some of these executables may include sign-up services. Sign up services may include functions such as collection and databasing of customer information by a customer information module 98a, preferences by a preferences module 98b, transactional information by a transaction module 98c, credit card information by a credit card module 98d, and the like that will be used and relied upon by the user and the system 70 in future transactions.

Likewise, other services may include account management account by an management module 98e. For example, viewing order history, receipts, checking payments made, and the like, as well as disputing charges, correcting pricing between advertised and ordered product pricing compared with actual billed pricing, and the like may all be done through the account management module 98e of the customer web application 88 responsible for account management.

To the extent that users may have relied upon coupons, advertised discounts, status-based promotional discounts, or the like, all may be recorded, maintained, and re-accessed by a user in the account management module 98e of the customer web application 92 executables. In one embodiment, the system 70 may automatically incorporate discounts, coupons, and the like. For example, if a coupon is presented to a user by the system 70, and a user clicks on, or otherwise engages a coupon, then no action is required by the user to implement the use of that coupon in a purchase.

In other embodiments, user traffic may be driven to the system 70 by advertising in other media, such as television, radio, print media, and the like. For example, if a user access code is provided, a user may then become entitled to the coupon, discount, or other benefit associated with that code. Thus, whether delivered entirely over the system 70, through the internet, by SMS messaging or the like, or other advertising media, all discounting, couponing, and tracking thereof may be done by the system 70.

Accordingly, the account management application or executable may then provide a complete record to a user of exactly what was presented to the user, the terms thereof, benefits selected by a user, and how those propagated through the transaction.

One benefit in of account management, to the system 70 and to a user, is that order histories may be tracked. A customer may interact with the system 70 to select particular orders as favorites. Some people thrive on variety. Others thrive on routine. Thus, the order histories may be tracked for the benefit of a user, and the system 70.

In some embodiments, order histories may be used to determine particular advertising and couponing benefits. For example, if a user regularly orders a particular drink, the couponing for another type or brand of drink may be targeted in order to add or build market share for the new brand. By the same token, inasmuch as a user always selects a particular flavor and brand of a particular soft drink, an order from that particular customer found lacking an order for that particular drink may be couponed in order to motivate the user to add on something known by the system 70 to be a regular and favorite order.

Customer service executables may provide interaction with the user and the system 70 in order to support orders. For example, clarifications, corrections, cancellations, and the like may be supported by the customer services module. Likewise, problem resolution, whether an order mix up, a pricing issue, a refund issue, or the like may also be treated through the customer services module.

For example, with a digital communication system, most errors can be expected to be created by mis-keyed order information from a user. Thus, correction may be needed to the extent that an order system, despite redundancy, checking, and the like to verify a customer order, and provide a customer order information back to the customer for verification, receives errors that may occur. Even the system 70, as some have experienced at grocery checkouts, may have pricing input erroneously into the system 70. Accordingly, it is to the benefit of the operator of the system 70, as well as to the user to quickly identify and correct mispricing types of information.

A venue web application 90 or venue module may provide a listing of venues supported by the system 70. For example, particular locations, with all of the events for those locations may be listed by venue. In another embodiment, events, independent of venues, and sorted by event type, event date, or the like may be presented in an event module. Accordingly, one may select a venue nearby or an event of a particular type desired, by either means, a user may locate an event, a venue, from which to select a desirable event, or the like.

A ticketing module 98f may provide ticketing for a user to a particular event, a particular venue, and a particular date. Likewise, a concessions module may provide for ordering of concessions. A merchandise module may provide for ordering and tracking sales of merchandise. Also, with respect to ticketing systems, a seating module may provide a view of seating, a price and seating comparison chart, and selection by a user of seating and ticketing selections.

In some embodiments, a preferences module 98b may provide for pick up and delivery preferences of a user, and preferred orders. Games 98g related to the ordering process, or promoting ordering may be implemented. Interactive applications 98h with respect to events may be provided.

Often, venues are anxious to provide interaction with a user, and may provide interactive applications 98h for engaging the user in the game or event hosted at a venue. For example, games may require a user to identify how many points were made by any particular player in an event, which players are playing in which innings or quarters of a game, statistics, or the like for individual players may help involve the user, and educate the user as to the game, the players, the teams, the scores, and the like.

In other embodiments, surveys may be taken by a survey module 98*i*. Because the system 70 may provide very focused information, surveys may be particularly short, and particularly useful. Surveys may rely on all of the stored information from transactions and users. Information including events attended, and the like may assist in providing a very succinct survey, much less obnoxious than those requiring a user to provide large amounts of demographic information. For example, with permission, the system 70 may access the demographic information already stored.

Likewise, other statistical modules 98*j* may provide statistical information regarding events, may provide at the touch of the button the statistics on a particular player, a particular team, or the like. Similarly, scores may be provided on demand, and games involving a user guessing, remembering, or trying to guess the game score by the end, or recalling game scores from other games, and the like may be used to involve the user in the activity attended, through the system 70.

Referring to FIG. 3, while also continuing to refer generally to FIG. 1, the fulfillment application 96 is responsible to interact with the core application 72 to determine whether orders exist in the system that need to be fulfilled. In one embodiment, each instance of the fulfillment application 96 existing in the system, will be associated with a venue. Accordingly, each fulfillment application instance 96 may interact with the core application 72 to determine whether or not the core application 72 has received orders from customers at the venue pertaining to the fulfillment application 96.

The fulfillment application 96 registers with the core application 72. The core application 72 is then in a position to make routing decisions according to which fulfillment applications 96 are open and registered with the core application 72.

Fulfillment application instances 96 may actually be running in parallel, simultaneously, at a particular physical venue. However, each fulfillment application 96 itself, also represents a location or a sub-venue within the main physical venue. For example, a particular section of the stands may be served by a particular concessions outlet. Some number of merchandising outlets may be located therewith or in yet other locations. Each fulfillment location can fulfill orders and may register, through its fulfillment application 96, hosted at that location. Registration establishes a commercially active fulfillment application 96.

The administrative web application 94 asserts the overall control over the input of event information. Each of the administrative web applications 94 corresponds to a particular physical venue. For example, a stadium, an arena, a performance center, or the like may host an instance of a venue web application 92 providing information to the core application 72 concerning events scheduled at that particular venue.

Using the venue web application 92, an administrator at a venue may provide to the core application 72 a listing and schedule of all events, seating plans, and so forth associated with that venue and each event. In one embodiment, the information received by the core application 72 from the venue web application 92 permits the core application 72 to interact with the fulfillment application 96. For example, the core application 72 "knows" a particular venue is hosting a particular event. Registration by a fulfillment application 96 with the core application 72 from that venue, at that time, will then cue the core application 72 that the event is being serviced by the operating fulfillment application 96.

However, in some instances, some events may not have been preregistered with a core application 72. If the fulfillment application 96 registers with the core application 72, and the core application 72 does not yet contain data indicating an event for that venue at that time, then the core application 72 will still accommodate the request. The core application 72 will establish an event at the venue at the time by virtue of contact from the fulfillment application 96. In this way, small events will not be shut out from the system 70 due to the granularity of venue scheduling not reaching them.

Figure 4:
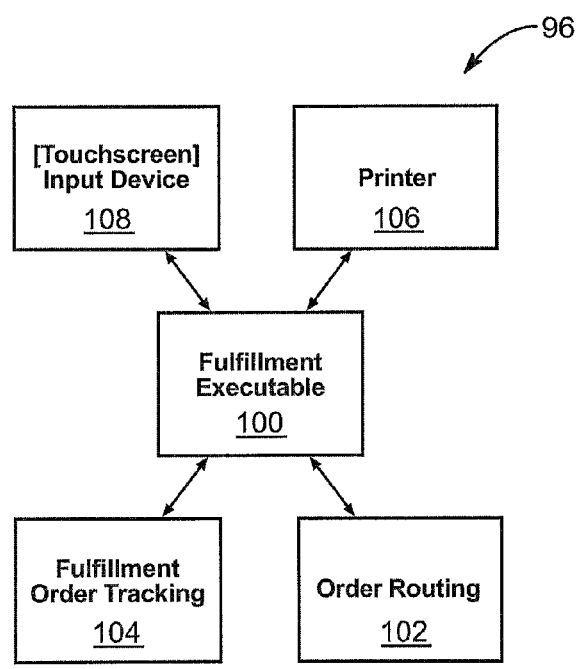
FIG. 4 is a schematic block diagram of details of the fulfillment application module 96 of FIG. 2, which system may run on the apparatus of FIG. 1.
Figure 5:
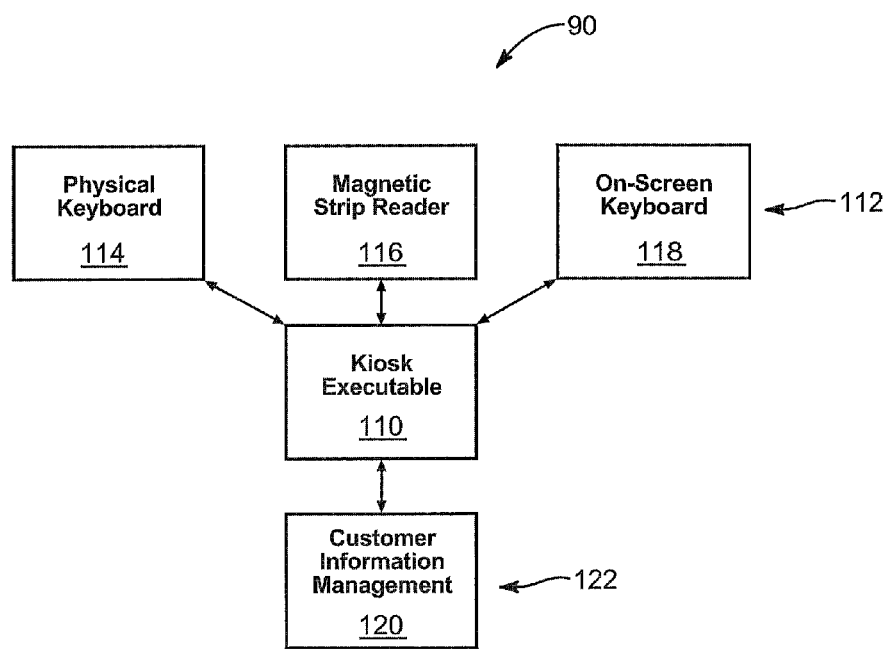
FIG. 5 is a schematic block diagram of the executable modules in the kiosk executable 110 and its affiliated modules, found within the kiosk application 90.

Referring to FIG. 4, the fulfillment application 96 may include a fulfillment executable 100. One may think of the fulfillment executable 100 as being the main process thread at the fulfillment location running the fulfillment application 96. Just as the core application 72 must coordinate for the entire system, the fulfillment executable 100 orchestrates processing at the fulfillment location.

The fulfillment executable 100 may include modules to do registration of the fulfillment application 96 with the core application 72. Likewise, the fulfillment executable 100 has responsibility to coordinate and interact with other modules in the fulfillment application 96.

For example, the fulfillment executable 100 interacts with an order routing module 102 responsible to direct orders. The order routing module 102 may actually be an interface with the core application 72 for handling orders. In another embodiment, the order routing module 102 may actually be a module within the core application 72. By either mode, the fulfillment executable 100 interacts with the order routing module 102 to determine orders placed by customers, and assign them for fulfillment to a particular fulfillment application 96.

Thus, the fulfillment executable 100 may poll the order routing module 102 on a regular basis to determine orders that have been taken into the system 70 and assigned to the fulfillment application 96. In response to that polling, the order routing module 102 sends information to the fulfillment executable 100 indicating customer orders, customer locations, and other requirements of the transaction to be completed.

Once the fulfillment executable 100 receives the information associated with an order, that information is presented in a human readable format to a person operating the fulfillment location. Thus, an input device 108 may be an interactive input and output device. Brackets herein indicate an "optional" mechanism as one particular implementation contemplated.

For example, the device 108 receives fulfillment information, regarding an order and a customer, from the fulfillment executable 100. It may immediately display that information to an operator. Alternatively, it may wait for a prompt or other action from a user. Alternatively the fulfilment executable 100 may send a prompt to a user and wait for the user to request display of the information. The user, operator, may then in any of the foregoing embodiments act on that information, such as through a keyboard, touchscreen, or the like. A touchscreen input device 108 may provide both the visible output readable by an operator, and also permit that same operator to immediately input information through the touchscreen as an input device.

In one embodiment, the fulfillment executable 100 may also interact with a printer 106. The fulfillment executable 100, upon receipt of order information from the order routing module 102 may print a slip by the printer 106. The slip may travel with the package, box, or other delivery mechanism of an order. For example, the printer 106 may be responsible to take the information received from the fulfillment executable 100, print it out on a slip, which slip is then physically stapled, taped, or otherwise associated with a bag or tray that will be delivered to the actual customer. Thus, the printer 106 provides a certain amount of accuracy check and redundancy in the electronic transfer of information.

For example, if a slip is without a container, then an order assumably remains unfulfilled. Likewise, when a customer receives an order, the slip is a confirmation of the contents of that tray, bag, or other container. Both the delivery person, and the customer can verify against the slip, the contents of the container. They can verify that the electronic transfer of information has resulted in the proper physical transfer of the desired, purchased product.

The slip may be printed in duplicate. This permits a permanent copy to be retained by the fulfillment location, while the other operates as a traveler. The traveler slip may operate as a receipt for the customer. In yet another embodiment, the traveler may actually go to the customer, attached to, or otherwise associated with the delivery container, but be removed after a check of the contents by the customer. The fulfillment person may then retrieve the slip copy and return it to the fulfillment location, thus verifying that the order as represented on the printed slip was fulfilled as requested, delivered as required, and checked out correctly. Thus, the "manufacturing traveler" of the food fulfillment or merchandise fulfillment operation verifies yet another quality control check by actual human reviewers.

In one embodiment, the fulfillment executable 100 may also present to an operator a particular screen of orders. Once the printer 106 has printed a slip, and the fulfillment of the order has begun, the fulfillment executable may so indicate by status indicators such as color, blinking entries, highlights, font changes, or the like. When the delivery person, runner, or the like, returns to the fulfillment location with the slip from the delivered container, the operator at the fulfillment location may input into the fulfillment executable 100 a code, a verification symbol, or other input that will change the status of the order in the fulfillment executable. The change in status will reflect that the fulfillment executable 100 has received the feedback that the order has either been delivered, remains unaccepted and undelivered, or otherwise indicating its disposition.

Just as the order routing module 102 may exist as a module within the code application 72, or as an interface between the fulfillment executable 100 and the core application 72, the order tracking module 104 may perform in a similar manner a different function.

For example, in one embodiment, the fulfillment order tracking module 104 may reside in the core application 72. The fulfillment executable 100 interacts with the fulfillment order tracking module 104 to report to the core application 72 the status of the order. The fulfillment executable 100 may report to the module 104 that an order has been received, served, sent out and so forth Likewise, upon return of the confirmation slip by a runner, the fulfillment order tracking module 104 may receive that information. Thus, as precisely as a series is desired to be tracked, the fulfillment executable 100 may report in to the core application 72.

For example, suppose that a situation exists where an order is received from the order routing module 102. Thereupon, the fulfillment executable 100 proceeds with fulfillment of the order. Reporting into the fulfillment order tracking module 104, the fulfillment executable 100 reports the order, reports preparation of the food, may report out sending of the runner with the fulfillment container, and so forth.

Now, suppose that the fulfillment executable 100 receives an input indicating that the order itself has returned, with the contents, container, and slip. The operator at the fulfillment location, reports in to the fulfillment executable 100 through an interface (e.g., touch screen, keyboard, etc.) that the order has not been delivered. The operator or fulfillment worker may simply touch a touch screen device 108 indicating a status change to return the order to the fulfillment or location.

Delivery failure may occur for several reasons. For example, suppose that an order were placed, and then a parent had to leave his or her seat with a young child heading for a restroom. A delivery worker (runner, fulfillment personnel) may arrive at the designated seats with an order, only to find the seats empty. The runner will return to the fulfillment location and report that the order has not been delivered because the seats are empty. The fulfillment operator inputs through the device 108 the new status, received by the fulfillment executable 100.

In turn, the fulfillment executable 100 reports through the fulfillment ordering tracking module 104 to the core application 72 that the order was not fulfilled. The core application 72 may also collect the information concerning the reason the order has not been fulfilled. In either mode, the core application may then forward a message back through the SMS module 80, in the device of the customer who made the order.

The core application 72 may tell that customer that the order was fulfilled but undeliverable. The message may explain why the order was not delivered. For example, the core application 72 may include information that the seats were empty and any or all of the slip order information. The customer may then be requested to correct any information previously input improperly.

If a customer has used a wrong seat number, the customer will need to look about, in order to correct the information.

In other circumstances, for example, an order may be returned because it is deemed to be the improper order. Many of these types of corrections may be made immediately on site between the runner and the customer. Inasmuch as the printed slip contains ordering information, the customer will be able to see immediately that the information in the SMS message sent is indeed corroborated exactly in the printed slip.

In the case of a refused order, that information may also be sent by the fulfillment executable 100 to the fulfillment order tracking module 104 for disposition by the core application 72. On the one hand, a customers is responsible to pay for items ordered. If a customer has mis-keyed an order, the customer may still be held responsible. However, the management of the fulfillment location may also decide if an accommodation is to be made. If an accommodation is made, that accommodation may be input into the fulfillment executable 100, including any change in the order, change of prices, or other accommodation negotiated with the customer.

In one embodiment, a circumstance may arise where an order is delivered to a location where a high level discriminator is input incorrectly by a user. Specifically, for example, having a seat number or a row number off by a single increment is not a major difficulty. However, if a customer inputs a customer location that is off by a section or several sections, the distance from a fulfillment location may be economically insurmountable. The order may simply not be worth the difficulty of delivering it.

Again, some sort of accommodation may be made, or the customer may be held responsible under the agreed upon terms of the fulfillment process. For example, if a customer mis-keys a order, the customer may still be responsible to pay for the order, even if it cannot be delivered. Regardless of any accommodation to satisfy a customer, the core application 72 may re-visit operation of the order routing module 102 to determine whether or not this same fulfillment location should still be responsible for fulfillment of the order. In the event that the fulfillment location is not to be responsible a new order may be made up at a new fulfillment location, and delivered by a different runner to the proper location for the ordering customer.

Also, if a fulfillment location runs out of a product, the product may be removed from the menu available to people served by that location. Alternatively, orders for that product may be routed to and fulfilled by a fulfillment location elsewhere at the venue.

Referring to FIG. 6, the kiosk executable 110 may rely on any suitable platform operating on top of an operating system. For example, in one embodiment the Microsoft "Dot Net 3.5" framework provides one suitable platform for executing the kiosk executable 110.

For example, the Dot Net framework of Microsoft provides a standardized library of executables to perform many of the commonly required functions that any application will need. Every application is going to need some type of input process, output process, access to various peripheral devices, and the like. Accordingly, a library of executables to perform this necessary "infrastructure" functionality for an application may be pre-built, and ready to be adapted to a particular executable, such as the kiosk executable 110.

One advantage of a platform like the Dot Net framework is that the functionality desired for a particular application may be built into the main executable, but may rely on well tested, reliable, supporting routines in the libraries, rather than developing them anew with some particular programming interface with every application.

As a practical matter, the core application 72 may also rely on a certain amount of the Dot Net technology available from Microsoft or a similar system provided by another supplier. However, in the case of the core application 72, it may typically execute within or on top of a web browser. By contrast, the kiosk executable 110 may typically execute directly on top of the operating system of the computer on which it runs.

For example, the kiosk executable 110 and the core application 72 may actually share some of the infrastructure libraries provided Dot Net framework. Nevertheless, each may operate at a somewhat different level in the computer.

As discussed hereinabove, the core application 72 may interact with a customer web application 88, a mobile web application 86, a smart phone application 84, or a kiosk application 90 in order to perform certain functions, such as sign-up of a new customer. Inasmuch as an individual may access the web through any browser, any computer, and any smart phone, such an apparatus may or may not be actually affiliated with the customer. Accordingly, in one embodiment it may be most convenient not to draw any customer information from the application programming interface (API) of any particular device used by a user.

When relying on the kiosk application 90, particularly for customer sign up, the paradigm changes slightly. For example, at the kiosk application 90, a user may input a credit card using a credit card reader. Each credit card contains a magnetic strip containing certain key customer information. Accordingly, the kiosk application 90 is uniquely situated to read and use certain customer information directly.

The kiosk application 90 may be much more efficient, requiring much less time of the user, and providing greater throughput of users. This may be particularly important at an venue event, where the kiosk application 90 may be available. There, it may be queued-up with a long line of customers waiting. Of course, customer waiting is anathema to customer service.

It is desired in an embodiment of an apparatus and method in accordance with the invention to minimize lines waiting to access a kiosk application 90. Inasmuch as kiosk applications 90 are typically running at venues on kiosks where individual customers have arrived for an event, time is extremely important. Thus, minimizing the time and maximizing the throughput of each kiosk application 90 has significant commercial benefits.

Nevertheless, one need not suppose that a kiosk application 90 runs only in a fixed physical location at a particular kiosk at a totally dedicated computer. One of the benefits of a kiosk application 90 is the fact that it is simply available at a venue for signing up new customers. In one embodiment, the kiosk application 90 may be loaded onto a battery of computers. For example, a bank of computers may be set up temporarily on tables in a lobby or on a concourse of an event venue.

In other embodiments, individual technicians may provide laptop computers and assistance to customers in a venue location, such as on a concourse, in a lobby, or even in the stands. Thus, the kiosk application 90 may be loaded onto computers that are brought to a venue for a sign up process, and then are removed to another venue, or put to other uses. Nevertheless, the throughput and wait time issues may still be readily handled by having a kiosk application 90 running on a computer at a venue, or running on numerous computers at a venue when signing up users is desirable and readily tractable.

For example, in one embodiment, a kiosk application 90 may be installed on a portable computer. The portable computer may be carried through a crowd, or provided at a desk or table, such as a service counter or simply a temporary table, by a technician. Likewise, an individual may roam through crowds waiting to enter a venue, or through the stands, prior to beginning an event, seeking out individuals who desire to sign up for services.

A peripheral interface, such as a USB interface may connect an electronic card reader to the computer. Moreover, a mobile web access point such as a broadband access point, a wireless modem, a WiFi access point, or the like may likewise be connected to the mobile computer. Thus, an individual technician may bring the kiosk application 90 to an individual during times when the individual really has few other priorities, such as before or after the customer is able to take a seat assignment. Thus, time waiting in line to enter, or sitting in the stands waiting for the event to begin, or the like may be particularly useful time for signing up customers, as they often have nothing else of priority they can accomplish during that time.

In one example, the customer credit card is passed by a magnetic card reader connected as a peripheral to the computer of the kiosk application 90. From the card reader, the computer, executing the kiosk executable 110 may upload to the core application 72 selected customer information. This may relieve the customer of the need to key in name, credit card number, credit card expiration date, credit card security code, and the like.

Inasmuch as the kiosk executable 110 of the kiosk application 90 may be operating on a remote computer, the keyboard, handwriting interface, touchscreen interface, or any other interface may be relied upon to input data from a customer. For example, customer preferences as to food entres, season ticket stadium locations, and the like are not contained on credit card magnetic strips. However, a customer may input such information directly, or a technician may input it for a customer by way of the kiosk executable 110.

Credit card data, customer name and address information, and the like may be collected in association with, and therefore easily linked to, other customer preference information from menu, to season ticket seating, or the like.

Thus, in general, a kiosk executable 110 may receive inputs from a physical keyboard 114, a magnetic strip reader 116, or an on-screen keyboard 118. Each of these input devices 112 may be made available to interact directly with the customer. In other embodiments, the input devices 112 may be acted upon by the technician "manning" the kiosk executable 110 and advising the customer, such as walking them through the signup process.

A representative or technician presenting the "kiosk" computer to a customer has the additional benefit of providing a point of sale presentation to the user, a response to questions of that user as a potential customer. The technician may do trouble shooting of either difficulties or questions that arise upon inputting responses to queries presented by the kiosk executable 110 to the customer.

The on-screen keyboard 118 may be configured as a simple touch screen menu, a touch screen template, or the like. A keyboard may be represented on part or all of the on-screen keyboard 118. Nevertheless, whether inputs come through a conventional keyboard 114, or some type of a stylized touch screen input device 118, a customer, a technician, or both may interact with the kiosk executable 110 to provide inputs, and to read instructions or outputs from the kiosk executable 110 communicating with them.

In general, any of the applications 84, 86, 88, 90 whether hosted on a smart phone, a computer, a user's computer, or the like may interact with a variety of application programming interfaces (APIs). Each of these APIs is programmed to interface with some functionality of the core application 72.

For example, in FIG. 3, numerous functional modules were identified in association with the core application 72. In order for one of the web applications 84, 86, 88, 90 to interact with the core application 72, an API dealing with the particular, desired functionality may be connected to interact with, or may be imbedded within, the kiosk executable 110 or other application 84, 86, 88, 90. In one currently contemplated embodiment, a customer information management module 120 may operate as an API to connect the kiosk executable 110 to the core application 72 to manage customer information. In general, each of these modules 122 or APIs 122 may provide an interface between the applicable application 84, 86, 88, 90, and the core application 72.

Referring to FIG. 6, while continuing to refer generally to all FIGS. 1-6, in certain embodiments, the core application 72 may contain various modules executing certain logical steps. Among those logical steps is accessing data from and inputting data to the database 74. Likewise, a function of the core application 72 is also to execute the logical processing required to use data obtained from the database 74. It will process information in order to provide data to be stored in the database 74.

Therefore, one API 130 in the core application 72, or otherwise operably connected thereto, may be thought of as the data access layer API 130. One responsibility for the data access layer API 130 is interacting between the database 74, and the various processing modules 122 relied upon by the core application 72.

For example, the data access layer API 130 is responsible to know and recognize the executable procedures or the procedures executed by various executables among the modules 122 for using or preparing data taken from or being returned into the database 74. Primarily, the modules 122 may be responsible to put out and to retrieve information for use by executables within the core application 72. In order to do so, they may interact with the data access layer API 130. The data access layer API 130 has programmed into it a knowledge or information reflecting the procedures executed in the database 74 to store or retrieve information needed by the modules 122.

Certain efficiencies may be obtained by providing the data access layer API 130 between the modules 122 and the database 74. In one embodiment, each of the modules 122 may access the database 74 directly. Nevertheless, considering the complexities and the processing requirements of a database engine and database 74, the preprocessing available by the data access layer API 130 provides for streamlining calls to the database 74. Thus, one may think of the data access layer API 130 as a broker packaging the calls and data that will be exchanged with the database 74.

The SMS message interpretation module 132 receives SMS message from the SMS aggregator 78. Of course, the SMS messages originate at a message origination or message termination module 80, MO/MT SMS module 80, a device of an individual user capable of sending out and receiving an SMS message. The interpretation module 132 receives an entire message, including all of its packaging information, such as metadata. In one embodiment, the message may be received as an XML document containing metadata, the actual message content, as well as any message packeting, such as headers, footers, and the like.

The message interpretation module 132 receives each document or SMS message from the SMS aggregator 78. The SMS message interpretation module 132 receives the entire message, and is responsible to subdivide it into its component parts. The interpretation module 132, for example, takes the message content and begins to parse it, seeking to identify recognizable words or synonyms corresponding to transactional or functional identifiers.

For example, a customer befuddled or otherwise confused or unable to navigate a menu or other transactional screen presented may type in the word "help." Accordingly the SMS message interpretation module 132 will find the text, recognize it as a request for help, and forward to the data access layer module 130 the request for help. Accordingly, the data access layer module 130 will then access the database 74 in order to retrieve the response to an input identified as help.

Meanwhile, the data access layer module 130 then provides the response back to the appropriate location. For example, inasmuch as a request for assistance or help is not an order for products, the data access layer module 130 may forward the response information from the database 74 back to the SMS message response module 136. Thus, even though the SMS message interpretation module 132 originates the request for help, the message response module 136 may actually receive back the content of the response to the help request.

In one embodiment of an apparatus and method in accordance with the invention, the data access layer module 130 may interact with an SMS order management module 134. In general, each of the modules 122 may access the database 74 through the data access layer module 130 by polling. The system 70 may alternatively operate on interrupts. Nevertheless, a system of polling by each of modules 122 allows each to check periodically whether any new information has been acquired by the database 74 for use by that particular module 122.

For example, the order management module 134 may receive parsed information provided from the message interpretation module 132. Typically, for example, the message interpretation module 132 may parse the content of an SMS message and determine whether an order has been placed, what that order is, and where that order is in processing. The order management module 134 may initiate the process of complying with the order, and may so notify the module 130, which then notifies the message response module 136.

Accordingly, the message response module 136 may rely on the data access layer module 130 to retrieve from the database 74 the information and text for the message response module 136 to build a message notifying the customer of the appropriate details, as the order has been received, thus confirming it. Likewise, the message response module 136 may also request additional information needed, such as, for example, a seat assignment, as requested by the order management module 134. Thus, the module 130 acts as a clearing house for information between the various modules 122, while also providing a consolidated access to the database 74 on behalf of all the modules 122.

In one embodiment, the email generation module 138 may provide email in messages or information to the email account identified with the customer. For example, a handheld electronic phone or similar device typically provides no written receipt. Nevertheless, when an order has been placed, and a charge has been made against the credit card of a customer, the customer typically will desire some form of receipt. Accordingly, the email generation module 138 may monitor action with respect to any customer, and report on that action as appropriate.

For example, the email generation module 138 may generate receipts and send them to the email account of a customer. Likewise, periodic, such as weekly or monthly accounting reports to each customer signed up for the system 70 may also originate as email from the generation module 138. Likewise, couponing, discount offers, advertising campaigns, and the like may be communicated to a customer by the email generation module 138.

Another situation where the email generation module 138 may be invoked is in signing up a user. The billing payment gateway 140 may handle all of the secure, confidential, or other sensitive information of a customer. Nevertheless, upon signup, a user may be provided a welcome message Likewise, special advertising, special offers, quick-reference key commands, or the like for interfacing with the system 70 may be provided by the email generation module 138 to a customer. The email generation module 138 obtains, by way of the data access layer module 130, information from the database 74, identifying, for example, new users or customers signed up, new actions taken with respect to any customer or order, and so forth.

The billing and payment (or billing/payment) gateway module 140 may be invoked for any of several reasons. For example, upon signup of a new customer, a new credit card number and all of its associated information may be gathered by the billing and payment gateway module 140. Likewise, this billing and payment gateway module 140 may create a record of card holder information. Meanwhile, authorization may be sought from the card provider in order to verify that the card is valid and can be charged for orders. Meanwhile, the billing/payment gateway module 140 may communicate through the module 130 to the database 74 to store and security access the customer information, including sensitive customer information.

In another situation, an incoming order may involve the billing/payment gateway module 140. After, for example, a runner returns from attempting to deliver an order, or delivering the order, the system 70 tracks the disposition of that order. If the order was properly delivered and accepted, then the billing/payment gateway module 140 may place a hold on the credit card account of the customer for the amount agreed upon.

Optimally, in order to have the benefit of batch processing, the gateway module 140 may execute all charges incurred during an event after the event is completed. Thus, the charges may be handled with a batch process more efficiently. Also, it is possible at the time an order is delivered that the gate module 140 is successful in placing a hold for a certain amount of money on a credit card account. Thus, the module 130 would have communicated to the database 74 that "hold" information in the proper amount for that customer.

However, if a difficulty should arise, such as the actual transfer of money not being permitted, then the gateway module 140 may notify the module 130 with the proper information so that the message response module 136 may communicate that information to a customer. Likewise the gateway module 140 may send information to the core application 72 indicating that a billing problem exists with the particular customer, and the credit card number provided.

As a practical matter, the system 70 may actually be programmed to simply accept the charges, and pay the amount that was held, but actually never billed to the customer. However, the system may acquire information to ascertain customer satisfaction, identify a source of a problem, and eradicate the problem. This may be initiated upon detection of the foregoing failure. Accordingly, various flags may be set in database 74 identifying problematic account numbers, credit card numbers, customers, and so forth.

The billing/payment gateway module 140 may also be invoked when a customer seeks to modify account information by accessing the core application 72 through one of the web applications 84, 86, 88, 90. In this instance, the gateway module 140 may send a request much as would occur at a new signup. Information may be requested from a customer, new authorization may be requested from a credit card provider, and so forth. All sensitive customer billing information may be consolidated to be managed exclusively by the billing/payment gateway module 140. The billing/payment gateway module 140 may actually be an API operating in conjunction with the data access layer module 130 of the core application 72. The actual payment gateway 76 may typically be operated as a third party service used by the system 70. It may actually provide the authorizations for transfers of assets in accounts.

In one embodiment, a phone number deactivation module 142 may be included in the modules 122 communicating with the data access layer module 130. The SMS aggregator 78 responsible to maintain the communication links with various SMS networks may regularly provide lists of phone numbers no longer valid. The deactivation module 142 may be responsible as an interface to control execution of a comparison of the list of deactivated phone numbers against the list of active customers with their respective phone numbers.

The deactivation module 142 may then communicate to the database 74 through the data access layer module 130 to remove certain phone numbers from the database 74. Alternatively, the deactivation module 142 may simply flag wrong numbers, and originate messages sent out by the email generation module 138 to the user indicating that the phone number no longer works, and that the customer must log into the system 70 on line to reconfirm or change, as appropriate, the phone number associate with the customer in the database 74.

In one embodiment, a practical problem may occur when a runner at a fulfillment location at a venue seeks to deliver an order to a particular section, row, and seat number, only to find no one present. When the runner returns to the service location, the worker may input the information indicating the order has failed to be delivered. Accordingly, the fulfillment executable 100 may, as described hereinabove, identify and initiate notification to the customer of the failure.

Thus, the order management module 134 and the message response module 136 may both be invoked to prepare a message to the customer. The customer may be notified of the disconnect in information, and be given an opportunity to correct ordering information, such as seat assignment, section, and the like. Accordingly, the order routing module 102 may then determine whether to attempt a re-delivery of the original product to the corrected order location, or to do otherwise.

For example, the system may otherwise determine that another fulfillment location may better fulfil the order, accordingly, the order routing module 102 may communicate to the data access layer module 130 the order routing information, to be stored in the database 74, and accessed subsequently and consequently by the fulfillment executable 100 as described hereinabove.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for computerized control creating individual and arbitrary point-of sale and delivery of products, the method comprising:
   providing a database comprising a database engine, executable on a processor, and records, containing data for processing by a processor;
   creating, by the database engine, the records corresponding to a venue, customers at the venue, customer devices corresponding individually to the customers, products available for delivery to the customers at the venue, fulfillment terminals, and fulfillment processors corresponding to each of the fulfillment terminals to direct the delivery of the products to the customers;
   providing a core terminal comprising a core processor programmed to receive orders from the customers, send fulfillment instructions to the fulfillment terminals, and control access to the database;
   communicating, by the core terminal, a request exchanged between the core terminal and a first customer device corresponding to a first customer;
   processing, by the core terminal, first customer data generated by at least one of the request and a response corresponding to the request processed by at least one of the first customer device and the core terminal an identifier uniquely identifying the at least one customer, contact information, corresponding to the at least one customer and including at least one electronic communication channel operably communicative between the first customer device and the core terminal;
   receiving, by the core terminal, from the first customer, through the first customer device,
      an order for at least one of the products and a delivery instruction directed to controlling delivery thereof to a customer location arbitrarily located within the venue and corresponding to the first customer;
   selecting, by the core terminal, a delivery terminal from among the fulfillment terminals, based on at least one of capacity, proximity, availability, time, stock, and the delivery instruction.

2. The method of claim 1, further comprising:
creating, by the core terminal, order information defining the order and reflecting the first customer, the at least one product, and the delivery instruction; and
delivering, by the core terminal to the delivery terminal at the venue, the order information.

3. The method of claim 2, further comprising:
processing, by the delivery terminal, the order information in association with preparation of delivery of the at least one of the products; and
dispatching, by the delivery terminal, to the first customer at the customer location, the at least one of the products.

4. The method of claim 3, further comprising:
providing a delivery processor;
traveling, by the delivery processor, with the at least one of the products to the customer location;
processing, by the delivery processor, status information reflecting the delivery of the at least one of the products.

5. The method of claim 4, further comprising;
reporting, by the delivery processor, to the delivery terminal, a delivery report reflecting the status of the delivery; and
reporting, by the delivery terminal, to the core processor, the status of the order.

6. The method of claim 2, further comprising:
reporting, by the delivery terminal, to the core terminal, the status of the order.

7. The method of claim 6, further comprising:
processing, by the core terminal, a financial transaction reflecting the delivery of the order and an electronic exchange of value corresponding thereto.

8. The method of claim 1, further comprising:
receiving, by the core terminal, from the first customer device co-located with the first customer, over the at least one electronic channel, the identifier;
providing directly to the first customer device, by the core terminal, a list of the products, and prices corresponding thereto.

9. The method of claim 1, further comprising:
communicating, to the first customer device located with the at least one customer, over the at least one electronic communication channel, a message from at least one of the core terminal and the delivery terminal.

10. The method of claim 1, further comprising:
providing to the core terminal, by the first customer device of the at least one customer, located with the customer location, the identifier, over the electronic communication channel; and
reading, by the core terminal, the identifier and location data from the first customer device co-located with the first customer at the customer location.

11. A method comprising:
providing a database creating and maintaining records corresponding to customers at a venue, customer devices corresponding individually to the customers, products marketed at the venue, and fulfillment processors each corresponding to a fulfillment terminal delivering the products to the customers;
providing a core terminal comprising a processor programmed to receive orders from the customers, send fulfillment instructions to the fulfillment terminals, and control access to the database;
obtaining from at least one customer, of the customers, an identifier uniquely identifying the at least one customer, contact information, corresponding to the at least one customer and
including at least one electronic communication channel operably communicative between the customer devices and the core terminal;
receiving, by the core terminal, from the at least one customer through a selected customer device associated therewith, an order for at least one of the products and a delivery instruction directed to controlling delivery thereof to a customer location arbitrarily located within the venue and corresponding to the at least one customer;
selecting, by the core terminal, a delivery terminal from among the fulfillment terminals, based on at least one of capacity, proximity, availability, time, stock, and the delivery instruction;
delivering, from the core terminal to the delivery terminal at the venue, order information defining the order and reflecting the delivery instruction;
dispatching, by the delivery terminal, to the at least one customer at the customer location, the at least one of the products.

12. The method of claim 11, further comprising:
reporting, into the delivery terminal, the status of the order;
reporting, by the delivery terminal, to the core terminal, the status of the order;
processing, by the core terminal, a financial transaction reflecting the delivery of the order and an electronic exchange of value corresponding thereto.

13. The method of claim 11, further comprising:
receiving, by the core terminal, from a customer computer device with the at least one customer, over the at least one electronic channel, the identifier;
providing directly to the customer computer device, by the core terminal, a list of the products, and prices corresponding thereto communicating, to a customer computer device located with the at least one customer, over the at least one electronic communication channel, a message from at least one of the core terminal and the delivery terminal.

14. The method of claim 13, further comprising reading, by the core terminal, the identifier and location data from a customer computer device located with the at least one customer at the venue.

15. The method of claim 14, further comprising:
receiving, by the core terminal, from a customer computer device with the at least one customer at the venue, over the at least one electronic channel, the identifier;
providing directly to the customer computer device, by the core terminal, designation data identifying at least one product from a list of the products;
receiving, by the core terminal from the customer computer device, order data reflecting a an order comprising a request for delivery of the at least one product;
exchanging, between the core terminal and the customer computer device, status information characterizing a status of the order;
receiving, by a delivery terminal with a delivery person proximate the at least one customer, transaction consummation data reflecting receipt by the at least one customer the at least one product; and
providing to the core terminal, by the delivery terminal, a transaction report reflecting the transaction consummation data.

16. The method of claim 15, further comprising:
reading, by the delivery terminal, credit data corresponding to the at least one customer;
providing, by the delivery terminal to the core terminal, the credit data;
receiving, by the core terminal, authorization to charge an account corresponding to the at least one customer; and
consummating, by the core terminal, a transaction, based on the authorization; and
reporting, by the core terminal to the delivery terminal a consummation of a transaction.

17. A system comprising:
a first computer, programmed to execute a core module maintaining a database of records corresponding to customers;
a second computer, programmed to execute a fulfillment module and operably connected to communicate over a network with the first computer;
a third computer, programmed to execute a customer module and operably connected to the network;
the first computer, wherein the core module comprises instructions receiving customer data from the third computer, the customer data identifying the third computer uniquely and the location thereof at a venue;
the first computer, wherein the core module is programmed to provide to the third computer, over the network, transaction information characterizing at least two of a product, a price, selection data indicating a purchase, and the customer data;
the second computer, programmed to receive from the first computer the customer data linked to order data identifying a selection of the product and authorization to charge a fee against an account corresponding to the third computer;
the third computer, further programmed to operate exclusively with a designated customer controlling the third computer at a venue proximate the second computer and to create the order data in response to inputs from the designated customer;
the second computer, further programmed to receive and respond to delivery data received from the first computer and reflecting a product, and the customer data;

the second computer, further programmed to provide to the first computer confirmation data reflecting consummation of delivery of the product to the location of the designated customer.

18. The system of claim 17, wherein:

the first computer is programmed to store records comprising product records corresponding to products, customer records corresponding to the customers, fulfillment records corresponding to the deliver data, and transaction data;

the second computer is programmed to store records comprising order records corresponding to orders for and delivery of products at the venue to the customers, status records reflecting a status between a time of ordering and a time of consummation of a transaction comprising delivery of the product and payment for the product, both at the venue, and transaction records reflecting financial transactions consummated in conjunction with the delivery and payment; and the second computer is further programmed to communicate with the first computer the status of failures of delivery.

19. The system of claim 17, further comprising:

the first computer further programmed to push advertising to the customers by sending communications to the third computer.

* * * * *

UNITED STATES PATENT AND TRADEMARK OFFICE
CERTIFICATE OF CORRECTION

PATENT NO. : 9,741,029 B2  
APPLICATION NO. : 13/453811  
DATED : August 22, 2017  
INVENTOR(S) : Nathaniel L. Checketts et al.

Page 1 of 1

It is certified that error appears in the above-identified patent and that said Letters Patent is hereby corrected as shown below:

On the Title Page

Item (75) Inventors, delete "M. Blake Freguson," and insert --M. Blake Ferguson--.

In the Claims

In Claim 15, Column 24, Line 13, "reflecting a an order" should read --reflecting an order--.

Signed and Sealed this  
Twenty-seventh Day of February, 2018

Andrei Iancu  
*Director of the United States Patent and Trademark Office*